(12) United States Patent
Fenyvesi et al.

(10) Patent No.: US 8,530,558 B2
(45) Date of Patent: Sep. 10, 2013

(54) PLASTICIZERS COMPRISING POLY(TRIMETHYLENE ETHER) GLYCOL ESTERS

(75) Inventors: Gyorgyi Fenyvesi, Wilmington, DE (US); Rahul B. Kasat, Wilmington, DE (US); Matthew Arthur Page, Wilmington, DE (US); Raja Hari Poladi, Bear, DE (US); Hari Babu Sunkara, Hockessin, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 586 days.

(21) Appl. No.: 12/435,609

(22) Filed: May 5, 2009

(65) Prior Publication Data

US 2009/0281220 A1    Nov. 12, 2009

Related U.S. Application Data

(60) Provisional application No. 61/051,136, filed on May 7, 2008.

(51) Int. Cl.
*C08K 5/103* (2006.01)
*C08K 5/101* (2006.01)
*C08L 29/04* (2006.01)
*C08F 116/38* (2006.01)

(52) U.S. Cl.
USPC ........... 524/317; 524/318; 524/322; 524/376; 524/503; 525/56

(58) Field of Classification Search
USPC ............ 524/317, 318, 322, 376, 503; 525/56
See application file for complete search history.

(56) References Cited

U.S. PATENT DOCUMENTS

| 2,520,733 | A | * | 8/1950 | Snider et al. ............... 568/619 |
| 4,433,103 | A | * | 2/1984 | Kamata et al. ................. 525/81 |
| 4,448,932 | A | * | 5/1984 | Ozari et al. ..................... 525/78 |
| 4,526,847 | A | * | 7/1985 | Walker et al. .................. 430/18 |
| 5,384,346 | A | * | 1/1995 | Gutweiler et al. ............ 524/100 |
| 6,608,168 | B1 | | 8/2003 | Ng |
| 7,323,539 | B2 | | 1/2008 | Sunkara et al. |
| 2003/0153716 | A1 | | 8/2003 | Wu et al. |
| 2004/0198900 | A1 | | 10/2004 | Madaj |
| 2005/0069997 | A1 | | 3/2005 | Adkesson et al. |
| 2005/0282966 | A1 | | 12/2005 | Sunkara et al. |
| 2008/0108845 | A1 | | 5/2008 | Sunkara et al. |
| 2009/0149584 | A1 | * | 6/2009 | Massonne et al. ............ 524/104 |

FOREIGN PATENT DOCUMENTS

| JP | 2000297180 A | * | 10/2000 |
| JP | 2008174619 A | | 7/2008 |
| WO | WO 2007122204 A1 | * | 11/2007 |
| WO | 2008057462 A | | 5/2008 |

OTHER PUBLICATIONS

English abstract of Shimizu et al. (JP 2000-297180); Jun. 4, 2011.*
English machine translation of Shimizu et al. (JP 2000-297180); Jun. 5, 2011.*
Currie, L.A. "Source Apportionment of Atmospheric Particles", Characterization of Environmental Particles.
Weber, D. et al., "13C-Pattern of Natural Glycerol: Origin and Practical Importance", J. Agric. Food Chem. 1997, 45, 2042-2046.
Hsieh, Yuch-Ping, "Division S-3—Soil Microbiology & Biochemistry", Soil Sci. Soc. Am. J., vol. 56, Mar.-Apr. 1992.
International Search Report, International Application PCT/US2009/042792, June 25, 2009.

* cited by examiner

*Primary Examiner* — Michael Pepitone

(57) ABSTRACT

Plasticizers comprising monoesters and/or diesters of poly(trimethylene ether) glycol are provided. The plasticizers can be used in plasticizing a variety of base polymers.

17 Claims, No Drawings

PLASTICIZERS COMPRISING POLY(TRIMETHYLENE ETHER) GLYCOL ESTERS

FIELD OF THE INVENTION

This invention relates to plasticizers comprising monocarboxylic acid esters (monoesters and/or diesters) of poly(trimethylene ether) glycol and their use in plasticizing a variety of base polymers.

BACKGROUND

Plasticizers are substances which, when added to another material, make that material softer and more flexible. Generally, this means that there is an increase in flexibility and workability, in some cases brought about by a decrease in the glass-transition temperature, Tg, of the polymer. The polymer to which a plasticizer is added is generally referred to as a "base polymer". One base polymer that is commonly plasticized is poly(vinyl chloride) (PVC), and another polymer is poly(vinyl butyral) (PVB).

Commonly-used plasticizers include phthalates, including, for example, diisobutyl phthalate, dibutyl phthalate, and benylbutyl phthalate; adipates, including di-2-ethylhexyl adipate; trimellitates, including tris-2-ethylhexyl trimellitate; and phosphates, including tri-e-ethylhexyl phosphate. However, the use of some of these have been curtailed due to potential toxicity issues. Polyester plasticizers have also been used, but those have generally been based on condensation products of propanediol or butanediol with adipic acid or phthalic anhydride, and therefore may exhibit very high viscosities which subsequently cause processing problems in blending with other polymers. Plasticization of polymers is disclosed, for example, in D. F. Cadogan and C. J. Howick in Kirk-Othmer Encylclopedia of Chemical Technology, John Wiley and Sons, Inc., New York, Dec. 4, 2000, DOI: 10.1002/0471238961.1612011903010415.a01.

Various monocarboxylic acid mono- and diesters of polytrimethylene ether glycol have properties that make them useful in a variety of fields, including as lubricants. U.S. patent application Ser. No. 11/593,954 discloses the production of these esters and their use in a variety of functional fluids.

Epoxidized vegetable oils are also widely used plasticizers for PVC and other polymer matrices. These materials can provide low migration into adjoining materials, synergistic stabilizing and better low-temperature flexibility of the plasticized polymer material. Some of the epoxidized vegetable oils have been approved for use in food packaging applications. In the epoxidation process soybean oil and tall oil fatty acids used to react hydrogen peroxide and acetic acid in the presence of a catalyst and generates performic acid and other undesirable impurities. Generally, vegetable oils (as soybean oils, or refined grades of tall oil fatty acids) are a mixture of different saturated/unsaturated fatty acids; therefore, to manufacture esters with controlled structure and molecular weight is very difficult.

A need remains for processes and compositions for plasticizing polymers while minimizing impurities and improving properties of the polymers.

SUMMARY OF THE INVENTION

One aspect of the present invention is a polymer composition, comprising an effective amount of plasticizer in a base polymer, wherein the plasticizer comprises an ester of poly (trimethylene ether) glycol.

Another aspect of the present invention is a process for producing a plasticized polymer, comprising:
 a. providing a base polymer;
 b. adding to the base polymer an effective amount of a plasticizer, wherein said plasticizer comprises an ester of poly(trimethylene ether) glycol;
 c. processing the base polymer and plasticizer to form a mixture; and
 d. cooling the mixture.

In some embodiments, the processing of the base polymer and plasticizer comprises melt processing at a temperature from 20 to 40° C. above the melt temperature of the base polymer.

In some embodiments, the processing of the base polymer and plasticizer comprises forming an aqueous slurry or solvent (i.e., containing a non-aqueous solvent) slurry.

The mixture after processing and cooling can be ground to form particles.

DETAILED DESCRIPTION

Unless otherwise defined, all technical and scientific terms used herein have the same meaning as commonly understood by one of ordinary skill in the art to which this invention belongs. In case of conflict, the present specification, including definitions, will control.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Use of "a" or "an" is employed to describe elements and components of the invention. This is done merely for convenience and to give a general sense of the invention. This description should be read to include one or at least one and the singular also includes the plural unless it is obvious that it is meant otherwise.

The materials, methods, and examples herein are illustrative only and, except as specifically stated, are not intended to be limiting. Although methods and materials similar or equivalent to those described herein can be used in the practice or testing of the present invention, suitable methods and materials are described herein.

According to embodiments of the present invention, plasticizers comprising one or more esters (a monoester, a diester or mixtures thereof) of a polytrimethylene ether glycol are provided. In preferred embodiments, the plasticizers are prepared from renewably sourced ingredients. "Mixtures thereof", as used herein in connection with a list of components, e.g., polymers, is intended to encompass mixtures of any two or more of the listed components, unless otherwise indicated.

The plasticizers are compositions comprising one or more compounds of the formula (I):

(I)

wherein Q represents the residue of a poly(trimethylene ether) glycol after abstraction of the hydroxyl groups, $R^2$ is H or $R^3CO$, and each of $R^1$, and $R^3$ is individually a substituted or unsubstituted aromatic, saturated aliphatic, unsaturated aliphatic, or cycloaliphatic organic group containing from 2 to 40 carbon atoms.

Poly(trimethylene ether) glycol esters are preferably prepared by polycondensation of hydroxyl groups-containing monomers (monomers containing 2 or more hydroxyl groups) predominantly comprising 1,3-propanediol to form poly(trimethylene ether) glycol, followed by esterification with a monocarboxylic acid. The ester compositions preferably comprise from about 50 to 100 wt %, more preferably from about 75 to 100 wt %, diester and from 0 to about 50 wt %, more preferably from 0 to about 25 wt %, monoester, based on the total weight of the esters.

Poly(trimethvlene ether) Glycol (PO3G)

Poly(trimethylene ether) glycol for the purposes of the present disclosure is an oligomeric or polymeric ether glycol in which at least 50% of the repeating units are trimethylene ether units. More preferably from about 75% to 100%, still more preferably from about 90% to 100%, and even more preferably from about 99% to 100%, of the repeating units are trimethylene ether units.

Poly(trimethylene ether) glycol is preferably prepared by polycondensation of monomers comprising 1,3-propanediol, thus resulting in polymers or copolymers containing —($CH_2CH_2CH_2O$)— linkage (e.g, trimethylene ether repeating units). As indicated above, at least 50% of the repeating units are trimethylene ether units.

In addition to the trimethylene ether units, lesser amounts of other units, such as other polyalkylene ether repeating units, may be present. In the context of this disclosure, the term "poly(trimethylene ether) glycol" encompasses PO3G made from essentially pure 1,3-propanediol, as well as those oligomers and polymers (including those described below) containing up to about 50% by weight of comonomers.

The 1,3-propanediol employed for preparing the poly(trimethylene ether) glycol may be obtained by any of the various well known chemical routes or by biochemical transformation routes. Preferred routes are described in, for example, US20050069997A1.

Preferably, the 1,3-propanediol is obtained biochemically from a renewable source ("biologically-derived" 1,3-propanediol).

A particularly preferred source of 1,3-propanediol is via a fermentation process using a renewable biological source. As an illustrative example of a starting material from a renewable source, biochemical routes to 1,3-propanediol (PDO) have been described that utilize feedstocks produced from biological and renewable resources such as corn feed stock. For example, bacterial strains able to convert glycerol into 1,3-propanediol are found in the species *Klebsiella*, *Citrobacter*, *Clostridium*, and *Lactobacillus*. U.S. Pat. No. 5,821,092 discloses, inter alia, a process for the biological production of 1,3-propanediol from glycerol using recombinant organisms. The process incorporates *E. coli* bacteria, transformed with a heterologous pdu diol dehydratase gene, having specificity for 1,2-propanediol. The transformed *E. coli* is grown in the presence of glycerol as a carbon source and 1,3-propanediol is isolated from the growth media. Since both bacteria and yeasts can convert glucose (e.g., corn sugar) or other carbohydrates to glycerol, the processes disclosed in these publications provide a rapid, inexpensive and environmentally responsible source of 1,3-propanediol monomer.

The biologically-derived 1,3-propanediol, such as produced by the processes described and referenced above, contains carbon from the atmospheric carbon dioxide incorporated by plants, which compose the feedstock for the production of the 1,3-propanediol. In this way, the biologically-derived 1,3-propanediol preferred for use in the context of the present invention contains only renewable carbon, and not fossil fuel-based or petroleum-based carbon. The PO3G and esters based thereon utilizing the biologically-derived 1,3-propanediol, therefore, have less impact on the environment as the 1,3-propanediol used in the compositions does not deplete diminishing fossil fuels and, upon degradation, releases carbon back to the atmosphere for use by plants once again. Thus, the compositions of the present invention can be characterized as more natural and having less environmental impact than similar compositions comprising petroleum based glycols.

The biologically-derived 1,3-propanediol, PO3G and PO3G esters, may be distinguished from similar compounds produced from a petrochemical source or from fossil fuel carbon by dual carbon-isotopic finger printing. This method usefully distinguishes chemically-identical materials, and apportions carbon in the copolymer by source (and possibly year) of growth of the biospheric (plant) component. The isotopes, $^{14}C$ and $^{13}C$, bring complementary information to this problem. The radiocarbon dating isotope ($^{14}C$), with its nuclear half life of 5730 years, clearly allows one to apportion specimen carbon between fossil ("dead") and biospheric ("alive") feedstocks (Currie, L. A. "Source Apportionment of Atmospheric Particles," *Characterization of Environmental Particles*, J. Buffle and H. P. van Leeuwen, Eds., 1 of Vol. I of the IUPAC Environmental Analytical Chemistry Series (Lewis Publishers, Inc) (1992) 3-74). The basic assumption in radiocarbon dating is that the constancy of $^{14}C$ concentration in the atmosphere leads to the constancy of $^{14}C$ in living organisms. When dealing with an isolated sample, the age of a sample can be deduced approximately by the relationship:

$$t=(-5730/0.693)\ln(A/A_0)$$

wherein t=age, 5730 years is the half-life of radiocarbon, and A and $A_0$ are the specific $^{14}C$ activity of the sample and of the modern standard, respectively (Hsieh, Y., *Soil Sci. Soc. Am J.*, 56, 460, (1992)). However, because of atmospheric nuclear testing since 1950 and the burning of fossil fuel since 1850, $^{14}C$ has acquired a second, geochemical time characteristic. Its concentration in atmospheric $CO_2$, and hence in the living biosphere, approximately doubled at the peak of nuclear testing, in the mid-1960s. It has since been gradually returning to the steady-state cosmogenic (atmospheric) baseline isotope rate ($^{14}C/^{12}C$) of ca. $1.2\times10^{-12}$, with an approximate relaxation "half-life" of 7-10 years. (This latter half-life must not be taken literally; rather, one must use the detailed atmospheric nuclear input/decay function to trace the variation of atmospheric and biospheric $^{14}C$ since the onset of the nuclear age.) It is this latter biospheric $^{14}C$ time characteristic that holds out the promise of annual dating of recent biospheric carbon. $^{14}C$ can be measured by accelerator mass spectrometry (AMS), with results given in units of "fraction of modern carbon" ($f_M$). $f_M$ is defined by National Institute of Standards and Technology (NIST) Standard Reference Materials (SRMs) 4990B and 4990C, known as oxalic acids standards HOxI and HOxII, respectively. The fundamental definition relates to 0.95 times the $^{14}C/^{12}C$ isotope ratio HOxI (referenced to AD 1950). This is roughly equivalent to decay-corrected pre-industrial Revolution wood. For the current living biosphere (plant material), $f_M \approx 1.1$.

The stable carbon isotope ratio ($^{13}C/^{12}C$) provides a complementary route to source discrimination and apportionment. The $^{13}C/^{12}C$ ratio in a given biosourced material is a consequence of the $^{13}C/^{12}C$ ratio in atmospheric carbon dioxide at the time the carbon dioxide is fixed and also reflects the precise metabolic pathway. Regional variations also occur. Petroleum, $C_3$ plants (the broadleaf), $C_4$ plants (the grasses), and marine carbonates all show significant differences in $^{13}C/^{12}C$ and the corresponding $\delta^{13}C$ values. Furthermore, lipid matter of $C_3$ and $C_4$ plants analyze differently than materials derived from the carbohydrate components of the same plants as a consequence of the metabolic pathway. Within the precision of measurement, $^{13}C$ shows large variations due to isotopic fractionation effects, the most significant of which for the instant invention is the photosynthetic mechanism. The major cause of differences in the carbon isotope ratio in plants is closely associated with differences in the pathway of photosynthetic carbon metabolism in the plants, particularly the reaction occurring during the primary carboxylation, i.e., the initial fixation of atmospheric $CO_2$. Two large classes of vegetation are those that incorporate the "$C_3$" (or Calvin-Benson) photosynthetic cycle and those that incorporate the "$C_4$" (or Hatch-Slack) photosynthetic cycle. $C_3$ plants, such as hardwoods and conifers, are dominant in the temperate climate zones. In $C_3$ plants, the primary $CO_2$ fixation or carboxylation reaction involves the enzyme ribulose-1,5-diphosphate carboxylase and the first stable product is a 3-carbon compound. $C_4$ plants, on the other hand, include such plants as tropical grasses, corn and sugar cane. In $C_4$ plants, an additional carboxylation reaction involving another enzyme, phosphenol-pyruvate carboxylase, is the primary carboxylation reaction. The first stable carbon compound is a 4-carbon acid, which is subsequently decarboxylated. The $CO_2$ thus released is refixed by the $C_3$ cycle.

Both $C_4$ and $C_3$ plants exhibit a range of $^{13}C/^{12}C$ isotopic ratios, but typical values are ca. -10 to -14 per mil ($C_4$) and -21 to -26 per mil ($C_3$) (Weber et al., *J. Agric. Food Chem.*, 45, 2042 (1997)). Coal and petroleum fall generally in this latter range. The $^{13}C$ measurement scale was originally defined by a zero set by pee dee belemnite (PDB) limestone, where values are given in parts per thousand deviations from this material. The "$\delta^{13}C$" values are in parts per thousand (per mil), abbreviated ‰, and are calculated as follows:

$$\delta^{13}C \equiv \frac{(^{13}C/^{12}C)\text{ sample} - (^{13}C/^{12}C)\text{ standard}}{(^{13}C/^{12}C)\text{ standard}} \times 1000\text{‰}$$

Since the PDB reference material (RM) has been exhausted, a series of alternative RMs have been developed in cooperation with the IAEA, USGS, NIST, and other selected international isotope laboratories. Notations for the per mil deviations from PDB is $\delta^{13}C$. Measurements are made on $CO_2$ by high precision stable ratio mass spectrometry (IRMS) on molecular ions of masses 44, 45 and 46.

Biologically-derived 1,3-propanediol, and compositions comprising biologically-derived 1,3-propanediol, therefore, may be completely distinguished from their petrochemical derived counterparts on the basis of $^{14}C$ ($f_M$) and dual carbon-isotopic fingerprinting, indicating new compositions of matter. The ability to distinguish these products is beneficial in tracking these materials in commerce. For example, products comprising both "new" and "old" carbon isotope profiles may be distinguished from products made only of "old" materials. Hence, the instant materials may be followed in commerce on the basis of their unique profile and for the purposes of defining competition, for determining shelf life, and especially for assessing environmental impact.

Preferably the 1,3-propanediol used as the reactant or as a component of the reactant will have a purity of greater than about 99%, and more preferably greater than about 99.9%, by weight as determined by gas chromatographic analysis.

The purified 1,3-propanediol preferably has the following characteristics:

(1) an ultraviolet absorption at 220 nm of less than about 0.200, and at 250 nm of less than about 0.075, and at 275 nm of less than about 0.075; and/or (2) a composition having CIELAB L*a*b*"b*" color value of less than about 0.15 (ASTM D6290), and an absorbance at 270 nm of less than about 0.075; and/or (3) a peroxide composition of less than about 10 ppm; and/or (4) a concentration of total organic impurities (organic compounds other than 1,3-propanediol) of less than about 400 ppm, more preferably less than about 300 ppm, and still more preferably less than about 150 ppm, as measured by gas chromatography.

The starting material for making PO3G will depend on the desired PO3G, availability of starting materials, catalysts, equipment, etc., and comprises "1,3-propanediol reactant." By "1,3-propanediol reactant" is meant 1,3-propanediol, and oligomers and prepolymers of 1,3-propanediol preferably having a degree of polymerization of 2 to 9, and mixtures thereof. In some instances, it may be desirable to use up to 10% or more of low molecular weight oligomers where they are available. Thus, preferably the starting material comprises 1,3-propanediol and the dimer and trimer thereof. A particularly preferred starting material is comprised of about 90% by weight or more 1,3-propanediol, and more preferably 99% by weight or more 1,3-propanediol, based on the weight of the 1,3-propanediol reactant.

As indicated above, poly(trimethylene ether) glycol may contain lesser amounts of other polyalkylene ether repeating units in addition to the trimethylene ether units. The monomers for use in preparing polytrimethylene ether glycol can, therefore, contain up to 50% by weight (preferably about 20 wt % or less, more preferably about 10 wt % or less, and still more preferably about 2 wt % or less), of comonomer polyols in addition to the 1,3-propanediol reactant. Comonomer polyols that are suitable for use in the process include aliphatic diols, for example, ethylene glycol, 1,6-hexanediol, 1,7-heptanediol, 1,8-octanediol, 1,9-nonanediol, 1,10-decanediol, 1,12-dodecanediol, 3,3,4,4,5,5-hexafluro-1,5-pentanediol, 2,2,3,3,4,4,5,5-octafluoro-1,6-hexanediol, and 3,3,4,4,5,5,6,6,7,7,8,8,9,9,10,10-hexadecafluoro-1,12-dodecanediol;

cycloaliphatic diols, for example, 1,4-cyclohexanediol, 1,4-cyclohexanedimethanol and isosorbide; and polyhydroxy compounds, for example, glycerol, trimethylolpropane, and pentaerythritol. A preferred group of comonomer diols is selected from the group consisting of ethylene glycol, 2-methyl-1,3-propanediol, 2,2-dimethyl-1,3-propanediol, 2,2-diethyl-1,3-propanediol, 2-ethyl-2-(hydroxymethyl)-1,3-propanediol, $C_6$-$C_{10}$ diols (such as 1,6-hexanediol, 1,8-octanediol and 1,10-decanediol) and isosorbide, and mixtures thereof. A particularly preferred diol other than 1,3-propanediol is ethylene glycol, and $C_6$-$C_{10}$ diols can be particularly useful as well.

One preferred poly(trimethylene ether) glycol containing comonomer is poly(trimethylene-ethylene ether) glycol. Preferred poly(trimethylene-ethylene ether) glycols are prepared by acid catalyzed polycondensation of from 50 to about 99 mole % (preferably from about 60 to about 98 mole %, and more preferably from about 70 to about 98 mole %) 1,3-propanediol, and from about 50 to about 1 mole % (preferably from about 40 to about 2 mole %, and more preferably from about 30 to about 2 mole %) ethylene glycol.

The preferred poly(trimethylene ether) glycol for use in the invention has an Mn (number average molecular weight) of at least about 134, more preferably at least about 1000, and still more preferably at least about 2000. The Mn is preferably less than about 5000, more preferably less than about 4000, and still more preferably less than about 3500. Blends of poly(trimethylene ether) glycols can also be used. For example, the poly(trimethylene ether) glycol can comprise a blend of a higher and a lower molecular weight poly(trimethylene ether) glycol, preferably wherein the higher molecular weight poly(trimethylene ether) glycol has a number average molecular weight of from about 1000 to about 5000, and the lower molecular weight poly(trimethylene ether) glycol has a number average molecular weight of from about 200 to about 950. The Mn of the blended poly(trimethylene ether) glycol will preferably still be in the ranges mentioned above.

Poly(trimethylene ether) glycols preferred for use herein are typically polydisperse having a polydispersity (i.e. Mw/Mn) of preferably from about 1.0 to about 2.2, more preferably from about 1.2 to about 2.2, and still more preferably from about 1.5 to about 2.1. The polydispersity can be adjusted by using blends of poly(trimethylene ether) glycols.

Poly(trimethylene ether) glycols for use in the present disclosure preferably has a color value of less than about 100 APHA, and more preferably less than about 50 APHA.

Poly(trimethylene ether) glycol can be made via a number of processes known in the art.

Poly(trimethylene ether) glycol esters are preferably prepared by polycondensation of hydroxyl groups-containing monomers (monomers containing 2 or more hydroxyl groups) predominantly comprising 1,3-propanediol to form a poly(trimethylene ether) glycol, followed by esterification with a monocarboxylic acid, as disclosed in U.S. application Ser. No. 11/593,954, filed Nov. 7, 2006, entitled "POLYTRIMETHYLENE ETHER GLYCOL ESTERS". Preferred monocarboxylic acids used in esterification are: propionic acid, butyric acid, valeric acid, caproic acid, caprylic acid, pelargonic acid, capric acid, lauric acid, palmitic acid, oleic acid and stearic acid, benzoic acid and 2-ethyl-hexanoic acid.

The poly(trimethylene ether) glycol esters can be used as plasticizers for a variety of polymers, herein also referred to as "base polymers". Although any ester can be used, including copolyether esters, particularly preferred ones for the present disclosure include poly(trimethylene ether) glycol 2-ethylhexanoate. Other copolyether esters include poly(trimethylene ether) glycol laureate, poly(trimethylene ether) glycol oleate, and poly(trimethylene ether) glycol stearate. Generally, the ester is added to the base polymer in an effective amount. As used herein, "effective amount" means the amount of plasticizer that provides improved physical properties to the base polymer (generally, increased flexibility, workability) so that the plasticized base polymer exhibits improved performance in the desired end use. Generally, the plasticizer is added to the base polymer in amounts of about 10 percent by weight or less, although it can be added in amounts up to about 40 percent by weight. When added at above about 10 percent by weight, the esters can function in such a way as to be termed "flow aids" in addition to to as plasticizers. The esters can be used as plasticizers (and flow aids) for a variety of base polymers. The base polymers for which the presently disclosed esters can be used as plasticizers include, for example, polyesters, polyamides, polyurethanes, polyolefins, polyvinyl chloride (PVC) and polyvinyl butyral (PVB), and mixtures thereof.

The plasticizer can be added to the base polymer using any convenient method know to the skilled artisan. Generally, the plasticizer is mixed with the base polymer in a mixer and the temperature is elevated to between 150 and 200° C., although this temperature is dependent on the melt temperatures of base polymer and plasticizer used. Alternatively to melt processing, solvent or aqueous (wet) slurry processes can be used to add plasticizer to the polymer.

After the base polymer and plasticizer are mixed (generally, 15 minutes to 60 minutes, but the time can vary depending upon the nature and properties of the materials mixed) the mixture is cooled. While any cooling method can be used, liquid nitrogen is generally used so that the plasticizer-base polymer mixture is cooled to a temperature where it can be ground.

Any grinding procedure can be used, and the material is generally ground to particle sizes of between about 0.1 and 10 mm, or any size that will allow further processing. Once the material is ground, then it is dried at a slightly elevated temperature (generally around 80° C.) under an inert atmosphere (generally nitrogen gas). The dried, ground material can then be further processed to form the desired product. The processing can take place in an extruder, or press mold, for example.

The amount of poly(trimethylene ether) glycol ester added to a base polymer is in the range from 1 to 40% by weight based on the total combined weight of the base polymer and plasticizer. In preferred embodiments, about 2 to 30% by weight of poly(trimethylene ether) glycol ester is used.

The poly(trimethylene ether) glycol esters can be blended with other known ester plasticizers such as, for example, synthetic and natural esters. Natural esters include vegetable based triglyceride oils such as soybean, sunflower, rapeseed, palm, canola, and castor oils. Preferred vegetable oils include castor oil, high oleic soybean and high oleic sunflower oils.

After the material has been processed, the composition is tested by a variety of methods, including tensile and tear strengths at given temperatures, burst strengths, burning characteristics, electrical properties, dielectric properties, surface characteristics (feel or "hand" and resistance to soiling and staining), and pliability at given temperatures (Durometer hardness and bending properties). Various test methods are commonly used, such as ASTM No. D638.

EXAMPLES

The present invention is further illustrated in the following examples. These examples, while indicating preferred embodiments of the invention, are presented by way of illustration only. From the above discussion and these examples, one skilled in the art can ascertain the essential characteristics of this invention, and without departing from the spirit and scope thereof, can make various changes and modifications of the invention to adapt it to various usages and conditions.

All parts, percentages, etc., are by weight unless otherwise indicated.

Example 1

This example illustrates the synthesis of a 2-ethylhexanoate ester of polytrimethylene ether glycol.

1,3-propanediol (2.4 kg, 31.5 moles) was charged into a 5 L flask fitted with a stirrer, a condenser and an inlet for nitrogen. The liquid in the flask was flushed with dry nitrogen for 30 minutes at room temperature and then heated to 170° C. while being stirred at 120 rpm. When the temperature reached 170° C., 12.6 g (0.5 wt %) of concentrated sulfuric acid was added. The reaction was allowed to proceed at 170° C. for 3 hours, and then the temperature was raised to 180° C. and held at 180° C. for 135 minutes. A total of 435 mL of distillate was collected. The reaction mixture was cooled, and then 2.24 kg (14.6 moles) of 2-ethylhexanoic acid (99%) was added. The reaction temperature was then raised to 160° C. under nitrogen flow with continuous agitation at 180 rpm and maintained at that temperature for 6 hours. During this period an additional 305 mL of distillate water was collected. Heating and agitation were stopped and the reaction mixture was allowed to settle. The product was decanted from about 5 g of a lower, immiscible by-product phase. NMR analysis of the by-product phase confirmed that no carboxylic acid esters were present.

2.0 kg of the polytrimethylene ether glycol ester product was mixed with 0.5 kg of water, and then the resulting mixture was heated at 95° C. for 6 hours. The aqueous phase was separated from the polymer phase, and then the polymer phase was washed twice with 2.0 kg of water. The resulting product was heated at 120° C. at 200 mTorr to remove volatiles (255 g).

The resulting ester product was analyzed using proton NMR. No peaks associated with sulfate esters and unreacted 2-ethylhexanoic acid were found. The calculated number average molecular weight was found to be 525. There was no sulfur detected in the polymer when analyzed using WDXRF spectroscopy method.

Example 2

In this example the ester obtained in Example 1 was fractionated into several fractions of differing molecular weights.

The product obtained in Example 1 was passed through a short path distillation apparatus under conditions of 160° C., 130 mTorr and a flow rate of 7 mL/minute. Two fractions were collected. The volatile fraction had a number average molecular weight of 370. The non-volatile fraction was once again passed through the short path distillation unit at 180° C., 110 mTorr and a flow rate of 4.5 mL. The volatile fraction from this run had a number average molecular weight of 460, corresponding largely to trimer and tetramer esters.

Example 3

This example illustrates the preparation of the 2-ethylhexanoate ester of polytrimethylene ether glycol of higher molecular weight than that prepared in Example 1.

The raw materials and procedure were the same as those described in Example 1, with the exceptions that the amount of sulfuric acid was increased to 14.9 g (0.6 wt %) and the polymerization time was increased from 315 to 525 minutes. A total of 545.3 mL of distillate was collected during polymerization. The esterification was carried out by adding 943.8 g (6.5 moles) of 2-ethylhexanoic acid as described in Example 1. The distillate collected during esterification was 113 mL.

After hydrolysis, the product was purified by neutralizing free sulfuric acid remaining in the product. The neutralization was carried out as follows. The product (1516 g) was transferred to a reaction flask, 0.15 g of $Ca(OH)_2$ in 15 mL of deionized water was added, and the mixture was heated to 70° C. while stirring under nitrogen stream. The neutralization was continued for 3 hours and then the product was dried at 110° C. for 2 hours under reduced pressure and filtered to remove solids. After filtration, the product was analyzed and found to have a number average molecular weight of 870.

Example 4

This example illustrates the synthesis of a 2-ethylhexanoate ester of a poly(trimethylene-co-ethylene ether) glycol ester.

1,3-propanediol (0.762 kg, 10 moles) and ethylene glycol (0.268 kg, 4.32 moles) were charged into a 5 L flask fitted with a stirrer, a condenser and an inlet for nitrogen. The liquid in the flask was flushed with dry nitrogen for 30 minutes at room temperature and then heated to 170° C. while being stirred at 120 rpm. When the temperature reached 170° C., concentrated sulfuric acid (5.2 g) was added to the reaction mixture. The reaction was allowed to proceed at 170° C. for 3 hours, and then the temperature was raised to 180° C. and held at 180° C. for 135 minutes. A total of 258 mL of distillate was collected. The reaction mixture was cooled, and then 0.5 kg kg (3.4 moles) of 2-ethylhexanoic acid (99%) was added. The reaction temperature was then raised to 160° C. under nitrogen flow with continuous agitation at 180 rpm and maintained at that temperature for 6 hours. During this period an additional 63 mL of distillate water was collected. The product was hydrolyzed and purified as described in Example 1.

The resulting ester product was analyzed using proton NMR. No peaks associated with sulfate esters and un-reacted 2-ethylhexanoic acid were found. The calculated number average molecular weight was found to be 620. There was no sulfur detected in the polymer when analyzed using WDXRF spectroscopy method.

Examples 5-10

The following examples illustrate plasticization of polyvinyl butyral (PVB) polymer with poly(trimethylene ether) glycol esters.

About 50 g of wet PVB (about 40% water) was mixed with about 150 g of hot water (38° C.) in a glass kettle. About 13 g of the poly(trimethylene ether) glycol-2-ethyl hexanoate was charged to the kettle. Plasticization was carried out for 4 hours at 38° C. and at 650 rpm. The plasticized PVB was washed with water and oven dried for 16 hours at 60° C.

The plasticized polymers were press molded (mold size 220 mm×150 mm) in a Teflon® coated aluminum mold at 220° C. Physical measurements were run on the test bars (ASTM D1708-06a) on an Instron Corporation Tensile Tester, Model no. 1125 (Instron Corp., Norwood Mass.) at 23° C. and 50% RH. Table 1 lists the properties of plasticized PVB.

TABLE 1

Mechanical properties of plasticized PVB polymer

| Example | Poly(trimethylene ether) glycol ester (Mn) | Tensile Modulus (MPa) | Stress @ Max (MPa) | Strain @ Break % |
|---|---|---|---|---|
| Comparative example | None | 1856.6 | 56.4 | 107.6 |
| 5 | 2-ethylhexanoate (500) | 13.4 | 24.5 | 245.6 |
| 6 | 2-ethylhexanoate (835) | 22.5 | 32.9 | 221.4 |
| 7 | Laureate (640) | 18.7 | 29.6 | 199.6 |
| 8 | Laureate (1300) | 378.8 | 34.6 | 195.2 |

Example 9

The experiment described in Example 5 was repeated with an amount 50% less of poly(trimethylene ether) glycol 2-ethylhexanoate and the results are reported below.

| Example | Poly (trimethylene ether) glycol ester (Mn) | Tensile Modules (MPa) | Stress @ Max (MPa) | Strain @ Break % | % Plasticizer |
|---|---|---|---|---|---|
| 9 | 2-ethylhexanoate (500) | 821.1 | 34.2 | 156.5 | 11.8 |

Example 10

42 g of PVB dried resin was blended with 18 g of poly(trimethylene ether) glycol-2-ethyl hexanoate using an industrial mixer (C. W. Brabender Instruments Inc. N.J.) for about 6 minutes. The mixer speed was 40 rpm and the mixer temperature was 210° C. After mixing the polymer was cooled, then liquid $N_2$ was used in the grinding process (Thomas industrial grinder, Thomas, Philadelphia, Pa.) to achieve 1-5 mm particle size of polymer. The ground polymer was dried at 80° C. in vacuum under $N_2$ blanket. The polymers were press molded (mold size 220 mm×150 mm) in a Teflon® coated aluminum mold at 220° C. Physical measurements were run on the test bars (ASTM D1708-06a) on an Instron Corporation Tensile Tester, Model no. 1125 (Instron Corp., Norwood Mass.).

| Example | Poly (trimethylene ether) glycol ester (Mn) | Tensile Modules (MPa) | Stress @ Max (MPa) | Strain @ Break % | % Plasticizer |
|---|---|---|---|---|---|
| 10 | 2-ethylhexanoate (500) | 12.7 | 26.7 | 308.5 | 28.7 |

What is claimed is:

1. A polymer composition, comprising an effective amount of plasticizer in a base polymer, wherein said plasticizer comprises an ester of a poly(trimethylene ether) glycol, wherein the base polymer is polyvinyl butyral and wherein the poly(trimethylene ether) glycol has a color value of less than about 100 APHA.

2. The composition of claim 1, wherein said effective amount of plasticizer is from 1 to 40% by weight based on the total combined weight of the base polymer and plasticizer.

3. The composition of claim 1, wherein said plasticizer is selected from the group consisting of poly(trimethylene ether) glycol 2-ethylhexanoate, poly(trimethylene ether) glycol laureate, poly(trimethylene ether) glycol oleate, and poly(trimethylene ether) glycol stearate.

4. The composition of claim 1, further comprising one or more additional natural or synthetic esters.

5. The composition of claim 4, wherein the one or more additional natural esters is selected from the group consisting of soybean oil, sunflower oil, rapeseed oil, palm oil, canola oil, castor oil, high oleic soybean oil and high oleic sunflower oil.

6. A process for producing a plasticized polymer, comprising:
 a) providing a base polymer, wherein the base polymer is polyvinyl butyral;
 b) adding to the base polymer an effective amount of a plasticizer, wherein said plasticizer comprises an ester of a poly(trimethylene ether) glycol, wherein the poly(trimethylene ether) glycol has a color value of less than about 100 APHA;
 c) processing said base polymer and plasticizer to form a mixture; and
 d) cooling said mixture and optionally grinding said mixture to produce particles.

7. The process of claim 6, wherein said processing comprises melt processing at a temperature from 20 to 40° C. above the melt temperature of the base polymer.

8. The process of claim 6, wherein said processing comprises forming an aqueous or solvent slurry.

9. The process of claim 6, further comprising forming an article from said particles by extrusion molding or press molding.

10. The process of claim 6, wherein said effective amount of plasticizer is from 1 to 40% by weight based on the total combined weight of the base polymer and plasticizer.

11. The process of claim 6, wherein said plasticizer is selected from the group consisting of poly(trimethylene ether) glycol 2-ethylhexanoate, poly(trimethylene ether) glycol laureate, poly(trimethylene ether) glycol oleate, and poly(trimethylene ether) glycol stearate.

12. The process of claim 6, wherein said plasticizer further comprises one or more additional synthetic or natural esters.

13. The process of claim 12, wherein said one or more additional natural ester is selected from the group consisting of soybean oil, sunflower oil, rapeseed oil, palm oil, canola oil, castor oil, high oleic soybean oil and high oleic sunflower oil.

14. The composition of claim 1, wherein said effective amount of plasticizer is from about 10% to about 30% by weight based on the total combined weight of the base polymer and plasticizer.

15. The composition of claim 1, wherein said plasticizer is selected from the group consisting of poly(trimethylene ether) glycol 2-ethylhexanoate and poly(trimethylene ether) glycol laureate.

16. The process of claim 6, wherein said effective amount of plasticizer is from about 10% to about 30% by weight based on the total combined weight of the base polymer and plasticizer.

17. The process of claim 6, wherein said plasticizer is selected from the group consisting of poly(trimethylene ether) glycol 2-ethylhexanoate and poly(trimethylene ether) glycol laureate.

* * * * *